(12) United States Patent
Nagai et al.

(10) Patent No.: US 11,982,550 B2
(45) Date of Patent: May 14, 2024

(54) ENCODER

(71) Applicant: Panasonic Intellectual Property Management Co., Ltd., Osaka (JP)

(72) Inventors: Shuichi Nagai, Osaka (JP); Masaru Shiraishi, Osaka (JP); Junya Aso, Kyoto (JP); Toshihiro Koga, Osaka (JP); Takuma Katayama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/044,215

(22) PCT Filed: Oct. 4, 2021

(86) PCT No.: PCT/JP2021/036540
§ 371 (c)(1),
(2) Date: Mar. 7, 2023

(87) PCT Pub. No.: WO2022/097399
PCT Pub. Date: May 12, 2022

(65) Prior Publication Data
US 2023/0358574 A1    Nov. 9, 2023

(30) Foreign Application Priority Data

Nov. 6, 2020    (JP) ................. 2020-185685

(51) Int. Cl.
*G01D 5/347*    (2006.01)
(52) U.S. Cl.
CPC ................. *G01D 5/3473* (2013.01)

(58) Field of Classification Search
CPC .......... G01D 5/34776; G01D 5/34784; G01D 5/34792; G01D 5/34794; G01D 5/3473;
(Continued)

(56) References Cited

U.S. PATENT DOCUMENTS

| | | | | |
|---|---|---|---|---|
| 3,591,841 A | * | 7/1971 | Heitmann | H03M 1/00 250/237 G |
| 5,663,794 A | * | 9/1997 | Ishizuka | G01D 5/38 250/237 G |

(Continued)

FOREIGN PATENT DOCUMENTS

| | | |
|---|---|---|
| JP | 02-115120 U | 9/1990 |
| JP | 2001-124537 | 5/2001 |

(Continued)

OTHER PUBLICATIONS

International Search Report of PCT application No. PCT/JP2021/036540 dated Dec. 21, 2021.

*Primary Examiner* — John R Lee
(74) *Attorney, Agent, or Firm* — Rimon P.C.

(57) ABSTRACT

Provided is an encoder capable of achieving high position resolution without being finely divided, and capable of detecting a rotation angle or the like with high sensitivity. The encoder includes: rotary plate having a plurality of reflection structures repeatedly formed and code including light reflector; irradiator that irradiates the plurality of reflection structures with light; and light receiver that receives light reflected by the plurality of reflection structures. Each of the plurality of reflection structures has a surface in a convex shape, and each of the plurality of reflection structures has a width that is an integral multiple of a width of light reflector.

22 Claims, 13 Drawing Sheets

ROTATION DIRECTION

(58) Field of Classification Search
CPC ........... G01D 5/34746; G01D 5/34723; G01D 5/34715; G01D 5/34707; G01D 5/347; G01D 5/34

See application file for complete search history.

(56) References Cited

U.S. PATENT DOCUMENTS

| | | | |
|---|---|---|---|
| 6,639,206 B1 | 10/2003 | Rothamel et al. | |
| 6,703,602 B1* | 3/2004 | Hao | G01D 5/34746 |
| | | | 250/237 R |
| 7,592,584 B2* | 9/2009 | Otsuka | G01D 5/34792 |
| | | | 250/208.2 |
| 7,619,209 B2* | 11/2009 | Wong | G01D 5/34792 |
| | | | 250/237 G |
| 7,784,694 B2* | 8/2010 | Foo | G01D 5/34715 |
| | | | 359/522 |
| 8,110,792 B2* | 2/2012 | Morimoto | G01D 5/24476 |
| | | | 250/231.14 |
| 8,759,746 B2* | 6/2014 | Sun | G01D 5/3473 |
| | | | 250/231.13 |
| 9,335,185 B2* | 5/2016 | Yoshida | H02K 11/22 |
| 9,341,500 B2* | 5/2016 | Lippuner | G01D 18/001 |
| 9,423,279 B2* | 8/2016 | Yoshida | G01D 5/34792 |
| 9,436,166 B2* | 9/2016 | Yoshida | G01D 5/34792 |
| 10,386,208 B2* | 8/2019 | Tseng | G01D 5/34715 |
| 11,002,572 B2* | 5/2021 | Boonsom | G01D 5/30 |
| 11,112,279 B2* | 9/2021 | Ohara | G01D 5/30 |
| 2003/0155491 A1 | 8/2003 | Ito et al. | |
| 2007/0114283 A1* | 5/2007 | Foo | G01D 5/34715 |
| | | | 235/454 |
| 2008/0111063 A1* | 5/2008 | Otsuka | G01D 5/34792 |
| | | | 250/237 G |
| 2008/0251701 A1* | 10/2008 | Wong | G01D 5/34707 |
| | | | 250/231.18 |
| 2009/0283667 A1* | 11/2009 | Morimoto | G01D 5/24409 |
| | | | 250/231.13 |
| 2010/0140463 A1* | 6/2010 | Villaret | G01D 5/2492 |
| | | | 250/231.14 |
| 2012/0153136 A1 | 6/2012 | Ishizuka | |
| 2013/0020475 A1* | 1/2013 | Sun | G01D 5/3473 |
| | | | 359/508 |
| 2015/0211898 A1* | 7/2015 | Sakata | G01D 5/34715 |
| | | | 250/231.1 |
| 2019/0128706 A1* | 5/2019 | Konishi | G01D 5/35354 |
| 2020/0088552 A1* | 3/2020 | Nagura | G01D 5/38 |
| 2020/0271483 A1* | 8/2020 | Boonsom | G01D 5/34715 |
| 2020/0284620 A1* | 9/2020 | Ohara | G01D 5/30 |

FOREIGN PATENT DOCUMENTS

| | | |
|---|---|---|
| JP | 2003-240606 | 8/2003 |
| JP | 2004-251772 | 9/2004 |
| JP | 2012-127820 | 7/2012 |
| JP | 2012-242313 | 12/2012 |
| JP | 2013-002874 | 1/2013 |
| JP | 2013-047692 | 3/2013 |
| JP | 2018-128413 | 8/2018 |

* cited by examiner

ROTATION DIRECTION

ENCODER

CROSS-REFERENCE TO RELATED APPLICATIONS

This application is a U.S. national stage application of the PCT International Application No. PCT/JP2021/036540 filed on Oct. 4, 2021, which claims the benefit of foreign priority of Japanese patent application No. 2020-185685 filed on Nov. 6, 2020, the contents all of which are incorporated herein by reference.

TECHNICAL FIELD

The present disclosure relates to an encoder, and particularly to an optical encoder.

BACKGROUND ART

Servomotors incorporated in machine tools, robots, or the like, use encoders to detect rotation angles of the servomotors. Known encoders include a mechanical encoder, a magnetic encoder, an optical encoder, and the like. The known encoders also include not only an encoder of a rotary type (rotary encoder) that detects rotational displacement such as a rotation angle, but also an encoder of a linear type (linear encoder) that detects linear displacement.

These encoders include an absolute encoder that detects displacement as an absolute value and an incremental encoder that detects displacement as a relative value. Examples of the rotary encoder include an absolute encoder that detects an absolute angle and an incremental encoder that detects a relative angle.

Known examples of an optical rotary encoder of an absolute type or an incremental type include an encoder of a light transmission type (e.g., see PTL 1). Rotary encoders of a light transmission type are configured to detect a rotation angle of a rotating motor or the like by irradiating a rotary plate provided in a predetermined pattern with light using a plurality of light transmissive parts composed of slits and the like, and receiving the light transmitted through the light transmissive parts.

CITATION LIST

Patent Literature

PTL 1: Unexamined Japanese Patent Publication No. 2004-251772

SUMMARY OF THE INVENTION

In recent years, an encoder of a light reflection type has been studied due to a demand for miniaturization and high position resolution of an encoder. Known examples of a rotary encoder of a light reflection type include a rotary encoder having a rotary plate on which a light reflector (light reflecting region) and a non-light reflector are formed in a predetermined pattern.

When a rotary encoder of a light reflection type formed as described above is finely divided to achieve high position resolution, or to acquire double positional accuracy, it is conceivable to halve size (size along a rotation direction) of each of the light reflector and the non-light reflector formed on the rotary plate.

Unfortunately, halving the size of each of the light reflector and the non-light reflector causes the amount of reflected light received by a light receiving element to be halved. As a result, detection sensitivity (S/N ratio) of the rotation angle may be deteriorated or the rotation angle may not be detected.

When the light reflector and the non-light reflector are finely formed, the light reflector and the non-light reflector are required to have higher accuracy in position or shape. As a result, there is a limit to finely form the light reflector and the non-light reflector. Additionally, an advanced manufacturing technique may be required to accurately form the light reflector formed finely.

The present disclosure is made to solve such problems, and it is an object of the present disclosure to provide an encoder capable of achieving high position resolution without being finely divided and capable of detecting a rotation angle or the like with high sensitivity.

To achieve the above object, an encoder according to an aspect of the present disclosure includes a board, an irradiator, and a light receiver. The board rotates or moves linearly. The board includes a plurality of reflection structures repeatedly formed and a code including a light reflector or a light transmissive part. The irradiator irradiates the plurality of reflection structures with light to be reflected on the plurality of reflection structures. The light receiver receives light reflected by the plurality of reflection structures. Each of the plurality of reflection structures has a surface in a convex or concave shape. The plurality of reflection structures each have a width that is an integral multiple of a width of the light reflector or the light transmissive part.

The encoder according to the present disclosure is capable of achieving high position resolution without being finely divided, and capable of detecting a rotation angle or the like with high sensitivity.

DESCRIPTION OF EMBODIMENT

Figure 1:
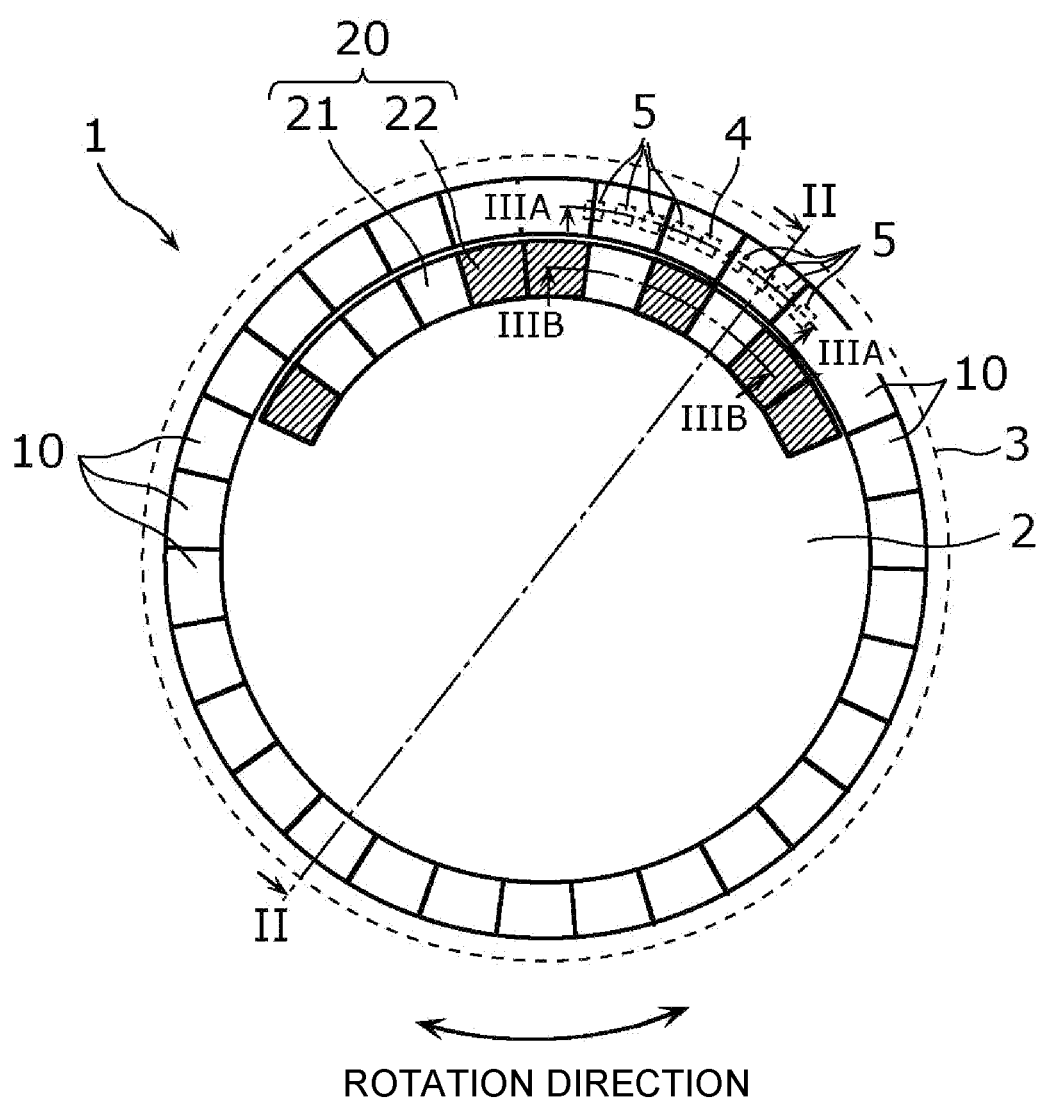
FIG. 1 is a top view of a rotary plate in an encoder according to a first exemplary embodiment.

Exemplary embodiments of the present disclosure will be described below with reference to the drawings. The exemplary embodiments described below each illustrate a specific example of the present disclosure. Thus, numerical values, shapes, materials, configuration elements, disposition positions and connection modes of the configuration elements, and the like described in the exemplary embodiments below are merely examples, and are not intended to limit the present disclosure. The exemplary embodiments below include components in which a component, which is not described in the independent claim showing the highest concept of the present disclosure, is described as an optional component.

Each drawing is a schematic diagram, and is not necessarily strictly illustrated. Thus, scales and the like are not necessarily matched in the respective drawings. In each drawing, substantially identical components are denoted by the same reference numerals, and duplicated description will not be described or will be simplified.

First Exemplary Embodiment

First, structure of encoder 1 according to a first exemplary embodiment will be described with reference to FIGS. 1, 2, 3A, and 3B.

Figure 2:
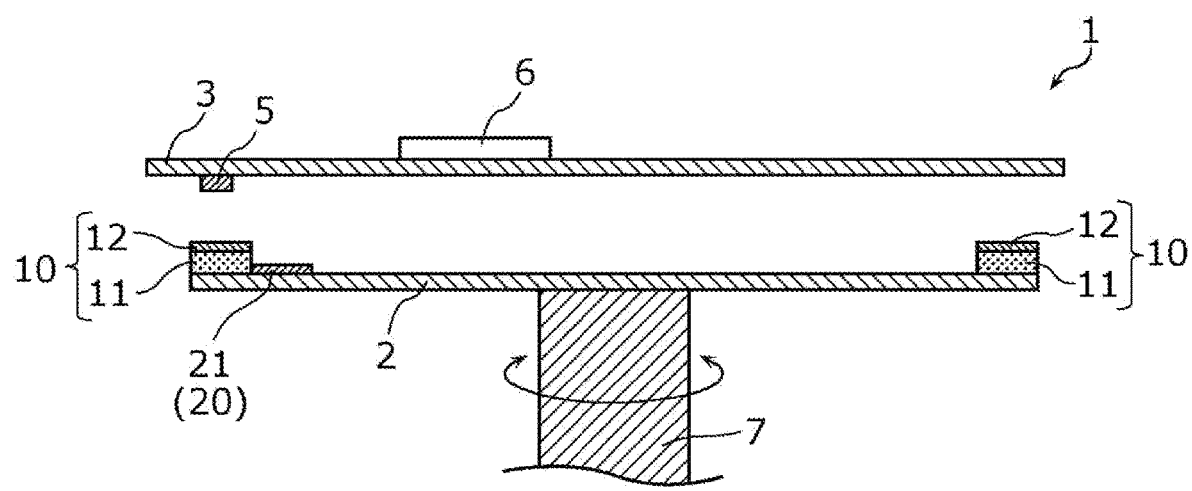
FIG. 2 is a sectional view of the encoder taken along a plane that passes along line II-II in FIG. 1 and that is perpendicular to the paper surface.
Figure 3A:
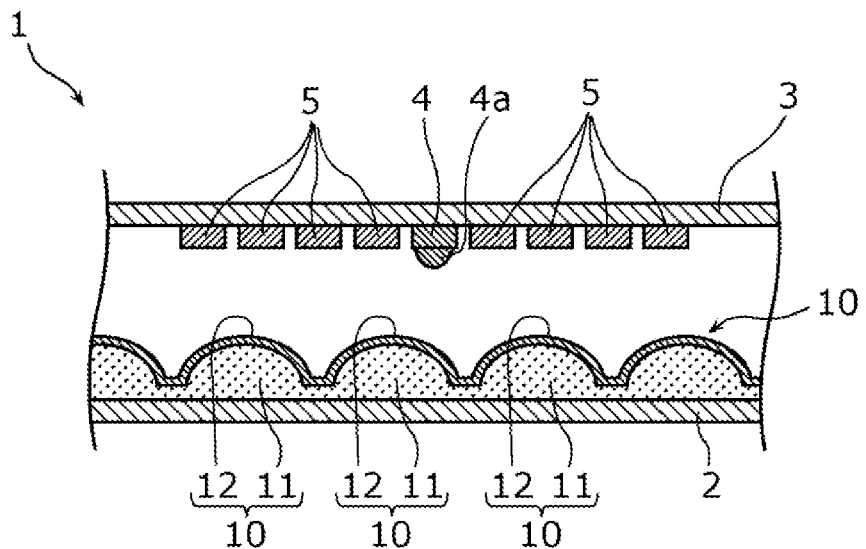
FIG. 3A is a partially enlarged sectional view of the encoder taken along a plane that passes along line IIIA-IIIA in FIG. 1 and that is perpendicular to the paper surface.
Figure 3B:
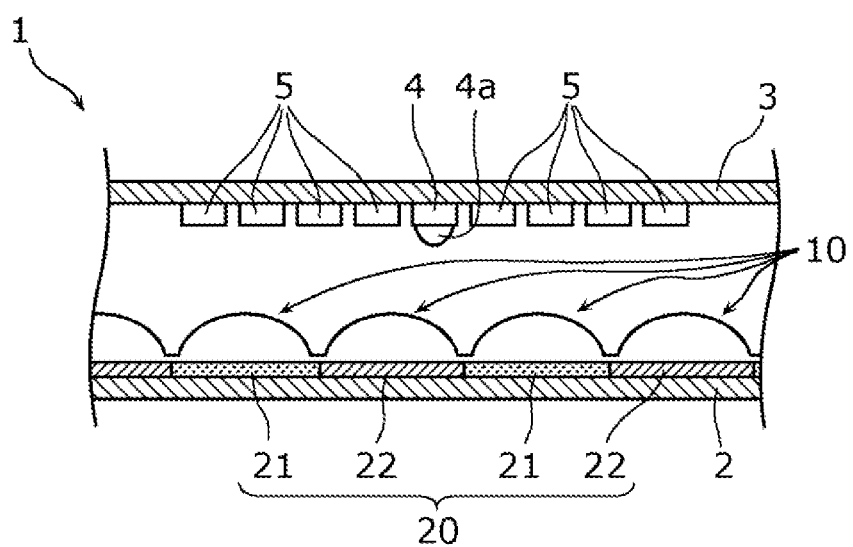
FIG. 3B is a partially enlarged sectional view of the encoder taken along a plane that passes along line IIIB-IIIB in FIG. 1 and that is perpendicular to the paper surface.

FIG. 1 is a top view of rotary plate 2 in encoder 1 according to the first exemplary embodiment. FIG. 2 is a sectional view of encoder 1 taken along a plane that passes along line II-II in FIG. 1 and that is perpendicular to the paper surface. FIG. 3A is a partially enlarged view of encoder 1 taken along a plane that passes along line IIIA-IIIA in FIG. 1 and that is perpendicular to the paper surface. FIG. 3B is a partially enlarged view of encoder 1 taken along a plane that passes along line in FIG. 1 and that is perpendicular to the paper surface. FIG. 1 illustrates non-light reflector 22 of code 20 with hatching for convenience to facilitate understanding of non-light reflector 22.

Encoder 1 illustrated in FIGS. 1 and 2 is an optical rotary encoder. Encoder 1 according to the present embodiment is a rotary encoder of a reflection type. Encoder 1 is used in combination with a motor such as a servomotor, for example. In this case, encoder 1 detects a rotation angle or rotation speed of a rotary shaft of the motor, for example.

As illustrated in FIGS. 1 and 2, encoder 1 according to the present embodiment includes rotary plate 2, fixing part 3, irradiator 4, light receiver 5, and processor 6.

Rotary plate 2 is a rotating board. Rotary plate 2 rotates in a rotation direction including both clockwise and counterclockwise directions, but the rotation direction is not limited to the above. For example, rotary plate 2 may rotate in only one of the clockwise direction and the counterclockwise direction. Rotary plate 2 is made of metal, for example, but may be made of resin, glass, ceramic, or the like. Rotary plate 2 has the shape of a circular flat plate as an example.

As illustrated in FIG. 2, rotary shaft 7 is attached to a central part of rotary plate 2. When rotary shaft 7 rotates, rotary plate 2 rotates about rotary shaft 7. Rotary shaft 7 rotates in synchronization with rotation of a rotating device. Rotary shaft 7 is a rotary shaft itself of a motor such as a servomotor, for example.

As illustrated in FIG. 1, rotary plate 2 has a plurality of reflection structures 10 repeatedly formed. The plurality of reflection structures 10 are light reflectors that reflect light emitted from irradiator 4, and are formed in a predetermined first pattern. The plurality of reflection structures 10 are provided in a line along a circumferential direction of rotary plate 2. As illustrated in FIG. 2, the plurality of reflection structures 10 are provided on a main surface of rotary plate 2, the main surface facing fixing part 3.

As illustrated in FIG. 1, the plurality of reflection structures 10 is provided over the entire circumference of rotary plate 2. The plurality of reflection structures 10 are formed at the outermost end part in a radial direction of rotary plate 2. Thus, the plurality of reflection structures 10 are formed on the outermost circumferential track of rotary plate 2.

The plurality of reflection structures 10 are identical in shape and size. Additionally, two reflection structures 10 adjacent to each other have an interval therebetween, the interval being identical in all of the plurality of reflection structures 10. That is, the plurality of reflection structures 10 are formed at equal intervals (same pitch) over the entire circumference of rotary plate 2.

As illustrated in FIGS. 3A and 3B, each of the plurality of reflection structures 10 has a surface in a convex shape in the present exemplary embodiment. As an example, each reflection structure 10 has a semicircular shape in section. Specifically, each reflection structure 10 has a semi-columnar shape with an axis in the radial direction of rotary plate 2. Thus, each reflection structure 10 has a surface (light reflection surface) formed as a cylindrical surface convex upward. As described above, the plurality of reflection structures 10 have a shape as a whole in which concavity and convexity are repeated along the circumferential direction of rotary plate 2. Although the surface of each reflection structure 10 may be formed as a hemispherical spherical surface instead of a cylindrical surface, the cylindrical surface is preferable to accurately detect reflected light from reflection structure 10.

As illustrated in FIGS. 3A and 3B, each of the plurality of reflection structures 10 includes convex part 11, and light reflection layer 12 formed on convex part 11. Light reflection layer 12 is formed on a surface of convex part 11 in the present exemplary embodiment, and constitutes the uppermost layer of reflection structure 10. Thus, the surface of each reflection structure 10 is a surface of light reflection layer 12.

Each reflection structure 10 includes convex part 11 that has a semi-columnar shape with an axis in the radial direction of rotary plate 2. Convex part 11 is made of a resin material, for example. Convex part 11 may be made of any one of a light transmission resin material such as a transparent resin material, and an opaque resin material. Convex part 11 can be manufactured by a method similar to that of a microlens array. The material of convex part 11 is not limited to a resin material, and may be a metallic material or the like.

Light reflection layer 12 is a light reflection film having light reflection characteristics of high reflectance for light emitted from irradiator 4, for example. Thus, light reflection layer 12 has a surface (light reflection surface) formed as a cylindrical surface convex upward. Light reflection layer 12 can be formed by sputtering, vapor deposition, or the like. As an example, light reflection layer 12 is a metal film made of a metallic material. In this case, the metal film may be made of a single metal or an alloy. Light reflection layer 12 is a light reflection film having a constant thickness.

Light reflection layer 12 is a single-layer film including one light reflection film, but is not limited thereto. For example, light reflection layer 12 may be a layered film in which the plurality of light reflection films are layered. Light reflection layer 12 is not limited to a metal film. For example, light reflection layer 12 may be a resin film made of a resin material, an oxide film, or the like. When light reflection layer 12 is a resin film, light reflection layer 12 may be a white resin film made of a white resin, for example. In this case, the white resin film can be formed also by a coating method. When light reflection layer 12 is an oxide film, light reflection layer 12 may be a dielectric multilayer film, for example.

The plurality of reflection structures 10 in the present exemplary embodiment are integrally formed. Specifically, a plurality of convex parts 11 are all integrally formed, and are one convex-concave structure in which concavity and convexity are repeated along the circumferential direction of rotary plate 2. Similarly, a plurality of light reflection layers 12 are all integrally formed as one continuous light reflection film having a constant thickness on the convex-concave structure including multiple reflection structures 10.

As illustrated in FIG. 1, rotary plate 2 includes code 20 including one or more light reflectors 21. Code 20 is a position detecting code for detecting a rotational position of rotary plate 2. Code 20 in the present exemplary embodiment is an M code (M-sequence code) having a predetermined number of bits. Code 20 is not limited to the M code, and may be a gray code, a binary code, a binary-coded decimal (BCD) code, or the like.

Light reflector 21 in code 20 is a light reflector that reflects light emitted from irradiator 4. Code 20 in the present exemplary embodiment further includes non-light reflector 22 that does not reflect light emitted from irradiator 4. Non-light reflector 22 is a light absorber that absorbs light, for example. Code 20 is composed of a plurality of light reflectors 21 and a plurality of non-light reflectors 22. Specifically, code 20 is composed of five light reflectors 21 and six non-light reflectors 22.

Code 20 is provided in a predetermined second pattern on the main surface of rotary plate 2, the main surface facing fixing part 3. Specifically, light reflectors 21 and non-light reflectors 22 constituting code 20 are provided on the main surface of rotary plate 2, the main surface being close to fixing part 3, in a predetermined order and with a predetermined number.

Code 20 is provided along the circumferential direction of rotary plate 2. Specifically, the plurality of light reflectors 21 and the plurality of non-light reflectors 22 constituting code 20 are provided in a line along the circumferential direction of rotary plate 2. Each of light reflectors 21 and non-light reflectors 22 is a unit code pattern (single region) of code 20, and is a minimum unit to be read by light receiver 5 when a position of rotary plate 2 is detected.

Code 20 in the present exemplary embodiment is provided in a partial region of rotary plate 2. Specifically, code 20 is provided side by side with the plurality of reflection structures 10. That is, light reflectors 21 and non-light reflectors 22 are provided side by side with the plurality of reflection structures 10. Code 20 is provided inside the plurality of reflection structures 10. Specifically, code 20 is formed on the second track from the outermost periphery of rotary plate 2.

The plurality of light reflectors 21 are identical in shape and size. The plurality of non-light reflectors 22 are identical in shape and size. Additionally, one light reflector 21 and one non-light reflector 22 are identical in shape and size. Then, all light reflectors 21 and all non-light reflectors 22 constituting code 20 have an identical interval between two adjacent light reflectors 21, an identical interval between two adjacent non-light reflectors 22, and an identical interval between adjacent light reflector 21 and non-light reflector 22. That is, light reflectors 21 and the non-light reflectors 22 constituting code 20 are all formed at equal intervals (same pitch).

Each of light reflectors 21 and non-light reflectors 22 is composed of a thin film having a flat surface, for example. Light reflector 21 and non-light reflector 22 are identical in thickness, but are not limited to this condition.

Light reflector 21 is a light reflection film having light reflectivity with high reflectance, for example, and can be formed by sputtering, vapor deposition, or the like. As an example, light reflector 21 is a metal film made of a metallic material. In this case, the metal film may be made of a single metal or an alloy.

Light reflector 21 is not limited to a single layer, and may be a layered film in which a plurality of light reflection films are layered. Light reflector 21 is also not limited to the metal film, and may be a resin film made of a resin material, an oxide film, or the like, as with light reflection layer 12 of reflection structure 10.

Non-light reflector 22 is a light absorbing film that absorbs light, for example. As the light absorbing film, a black resin film can be used, for example, but the light absorbing film is not limited thereto.

As illustrated in FIGS. 1 and 3B, each of the plurality of reflection structures 10 has a width (width in a column direction) that is an integral multiple of a width (width in the column direction) of light reflector 21 of code 20. Each of the plurality of reflection structures 10 corresponds to light reflector 21 on a one-to-one basis in the present exemplary embodiment, and each of the plurality of reflection structures 10 has a width that is one time a width of light reflector 21. Specifically, one reflection structure 10 and one light reflector 21 aligned in the radial direction of rotary plate 2 are equal in width. Here, the term, "width", means a width in units of angles along the column direction (direction along the circumference of rotary plate 2). Similarly, one reflection structure 10 and one non-light reflector 22 aligned in the radial direction of rotary plate 2 are also equal in width. As described above, encoder 1 according to the present exemplary embodiment is configured such that one reflection structure 10 corresponds to one unit code pattern of code 20 a one-to-one basis, and one reflection structure 10 and one unit code pattern of code 20 are equal in width.

The plurality of reflection structures 10 have an upper limit of width that corresponds to a total number (maximum number) of unit code patterns of code 20. For example, the number of unit code patterns of code 20 is fourteen in the present exemplary embodiment, so that the upper limit of width of the plurality of reflection structures 10 is a value obtained by summing fourteen unit code patterns of code 20.

Encoder 1 in the present exemplary embodiment can calculate a rotation angle and the like of rotary plate 2 by using light reflected by the plurality of reflection structures 10 and light reflected by code 20. In this case, all light reflectors 21 and all non-light reflectors 22 constituting code 20 may not be necessarily used. For example, when code 20 is a 7-bit M code, a rotation angle and the like of rotary plate 2 can be calculated by using a total of seven light reflectors 21 and seven non-light reflectors 22 (i.e., by using seven unit code patterns).

As illustrated in FIGS. 1 and 2, fixing part 3 is disposed facing rotary plate 2. Fixing part 3 does not rotate even when rotary plate 2 rotates. Fixing part 3 in the present exemplary embodiment is a board in the shape of a circular flat plate. Fixing part 3 is a wiring board such as a flame retardant type 4 (FR-4), for example, and is disposed parallel to rotary plate 2 at a position separated from rotary plate 2 by a predetermined distance. In this case, fixing part 3 is preferably disposed having a center coinciding with an axial center of rotary shaft 7. Fixing part 3 is fixed to a case (not illustrated) constituting a part of encoder 1 or the motor, for example.

Fixing part 3 is provided with irradiator 4, a light receiver 5, and processor 6. For example, irradiator 4, light receiver 5, and processor 6 are mounted as electronic components on fixing part 3 serving as a wiring board. Irradiator 4 and light receiver 5 are mounted on a first surface of fixing part 3, the first surface facing rotary plate 2, for example. In this case, irradiator 4 and light receiver 5 may be integrated as a light source module. Processor 6 is mounted on a second surface of the fixing part 3, the second surface being opposite to the first surface facing rotary plate 2. Fixing part 3 may be equipped with electronic components and the like other than irradiator 4, light receiver 5, and processor 6.

Irradiator 4 is a light source that irradiates rotary plate 2 with light. Specifically, irradiator 4 irradiates the plurality of reflection structures 10 and codes 20 with light. In this case, irradiator 4 irradiates a partial region of rotary plate 2 with light. Thus, a part of all reflection structures 10 is irradiated with the light emitted from irradiator 4. Irradiator 4 is composed of a light emitting element such as a light emitting diode (LED). Light emitted from irradiator 4 is visible light such as white light, but is not limited thereto. The light emitted from irradiator 4 may be infrared light, for example.

As illustrated in FIGS. 3A and 3B, encoder 1 in the present exemplary embodiment includes light collecting member 4a that concentrates light emitted from irradiator 4 toward the plurality of reflection structures 10. As an example, light collecting member 4a is a convex lens. Light collecting member 4a is provided on an emission surface of irradiator 4, for example. In this case, irradiator 4 and light collecting member 4a may be integrated as a light source module. As described above, using light collecting member 4a enables concentrating light emitted from irradiator 4 with light collecting member 4a to irradiate reflection structures 10 with the light. Light collecting member 4a preferably has a focal position on a light receiving surface of light receiver 5 (light receiving element).

Light receiver 5 receives light reflected by the plurality of reflection structures 10. Light receiver 5 is composed of a light receiving element such as a photo diode (PD), for example. Light receiver 5 in the present exemplary embodiment includes a plurality of light receiving elements. That is, the light reflected by the plurality of reflection structures 10 is received by the plurality of light receiving elements. The plurality of light receiving elements are arranged in a line and mounted on fixing part 3, for example. The plurality of light receiving elements may be integrated as a light receiving module.

Light receiver 5 receives light reflected by code 20. In this case, light receiver 5 may include a light receiving element (first light receiving element) that receives light reflected by reflection structure 10 and a light receiving element (second light receiving element) that receives light reflected by code 20.

Light receiver 5 may not include a plurality of light receiving elements as long as light reflected by each of the plurality of reflection structures 10 and a unit code pattern of code 20 can be individually received. For example, light receiver 5 may include an imaging element or the like having a light receiving surface capable of simultaneously receiving light reflected by the plurality of reflection structures 10.

Processor 6 illustrated in FIG. 2 is electrically connected to light receiver 5. Processor 6 calculates information on change in position of rotary plate 2 based on light receiving positions of the plurality of light receiving elements in light receiver 5. For example, processor 6 calculates a rotation angle, rotation speed, a rotation position, rotational speed, and the like of rotary plate 2 as the information on change in position of rotary plate 2. Processor 6 is an integrated circuit (IC) package or the like, for example.

Figure 4:
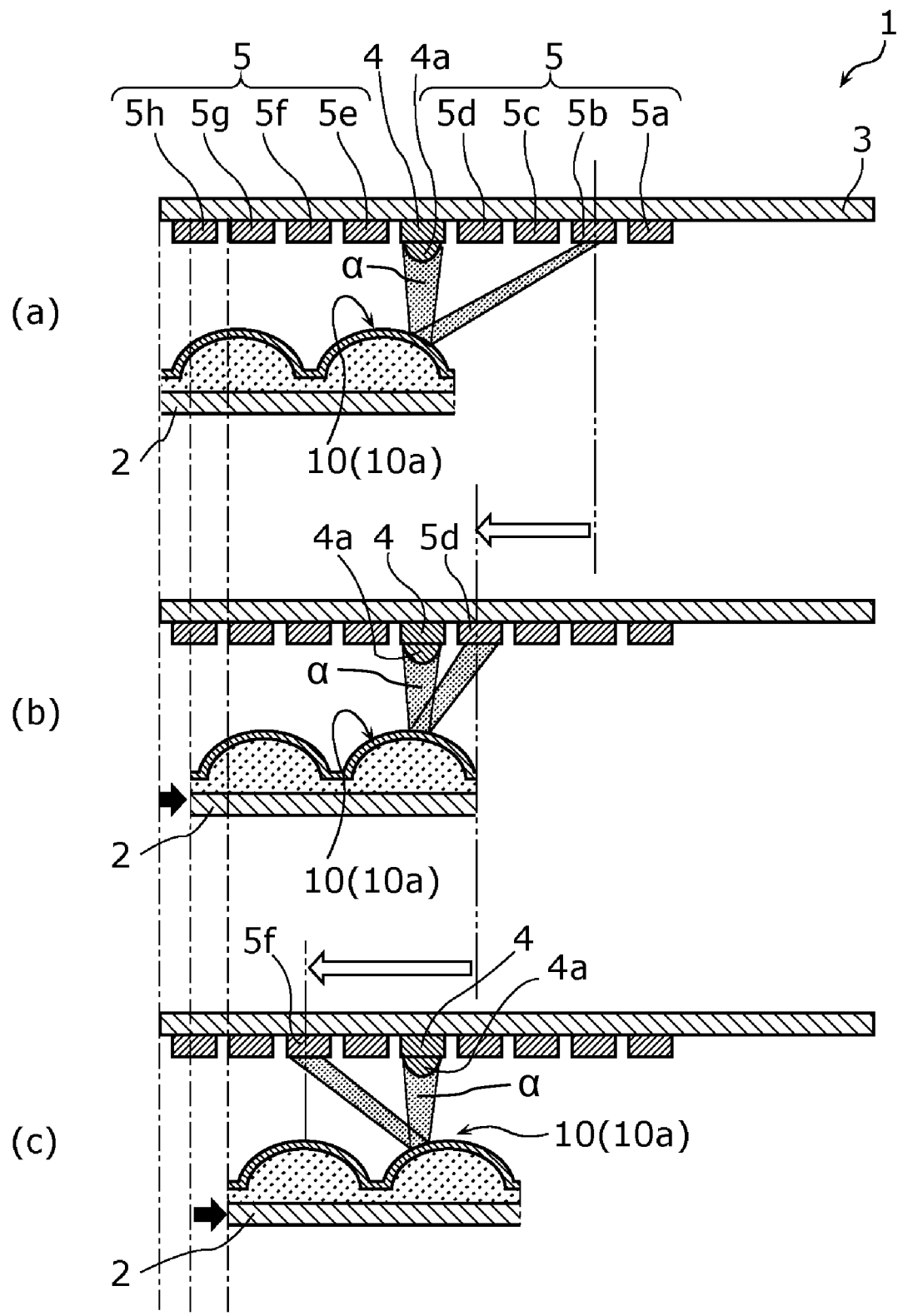
FIG. 4 is a diagram for illustrating operation of the encoder according to the first exemplary embodiment.

Next, operation of encoder 1 according to the present exemplary embodiment will be described with reference to FIG. 4. FIG. 4 is a diagram for illustrating operation of encoder 1 according to the first exemplary embodiment. FIG. 4 illustrates only a part of rotary plate 2. FIG. 4 illustrates eight light receiving elements 5a to 5h as light receiver 5.

When irradiator 4 emits light α toward rotary plate 2 rotating, light α emitted from irradiator 4 is sequentially reflected by the plurality of reflection structures 10 disposed side by side in the rotation direction and received by light receiver 5. At this time, when attention is paid to one reflection structure 10a of the plurality of reflection structures 10 as illustrated in FIG. 4, reflection structure 10a has a convex reflection surface. Thus, as rotary plate 2 rotates, reflection structure 10a changes in position relative to irradiator 4. Then, light α emitted from irradiator 4 and having reached reflection structure 10a is reflected at a reflection angle according to a curvature of the reflection surface of reflection structure 10a, and then is sequentially incident on eight light receiving elements 5a to 5h of light receiver 5.

Specifically, as rotary plate 2 rotates to change reflection structure 10a in position in the order of (a), (b), and (c) in FIG. 4 as indicated by black block arrows in FIG. 4, light α reflected by reflection structure 10a and incident on light receiver 5 changes in position as indicated by white block arrows in FIG. 4. That is, light α emitted from irradiator 4 and reflected by reflection structure 10a is incident on: light receiving element 5b when reflection structure 10a is located at a position in part (a) of FIG. 4; light receiving element 5d when reflection structure 10a is located at a position in part (b) of FIG. 4; and light receiving element 5f when reflection structure 10a is located at a position in part (c) of FIG. 4.

As described above, encoder 1 according to the present exemplary embodiment includes the plurality of reflection structures 10 each having a convex surface. Thus, light α reflected by reflection structure 10a and having reached light receiver 5 can be greatly changed in position as indicated by the white block arrows in FIG. 4 when reflection structure 10a is slightly changed in position by rotation of rotary plate 2 as indicated by the black block arrows in FIG. 4. For example, the change in position of the reflected light received by light receiver 5 with respect to the change in position of reflection structure 10a (rotary plate 2) can be changed in a range of about several times to 100 times. As an example, when reflection structure 10a (rotary plate 2) is changed in position by 10 μm, the reflected light received by light receiver 5 can be changed in position by about 0.49 mm.

Encoder 1 according to the present exemplary embodiment also allows light α emitted from irradiator 4 and reflected by reflection structure 10 to be incident on only one light receiving element of light receiver 5. Specifically, light collecting member 4a in the present exemplary embodiment concentrates light α emitted from irradiator 4 to allow light α reflected by reflection structure 10 to be incident on only one light receiving element of light receiver 5.

Then, light α received by light receiver 5 (light receiving elements 5a to 5h) is input to processor 6 as an electric signal. At this time, encoder 1 in the present exemplary embodiment includes the plurality of reflection structures 10 each of which has a width that is an integral multiple (one time in the present embodiment) of a width of the unit code pattern of code 20. As a result, processor 6 can calculate a rotation angle and the like of rotary plate 2 based on the electric signal from light receiver 5.

Figure 5:
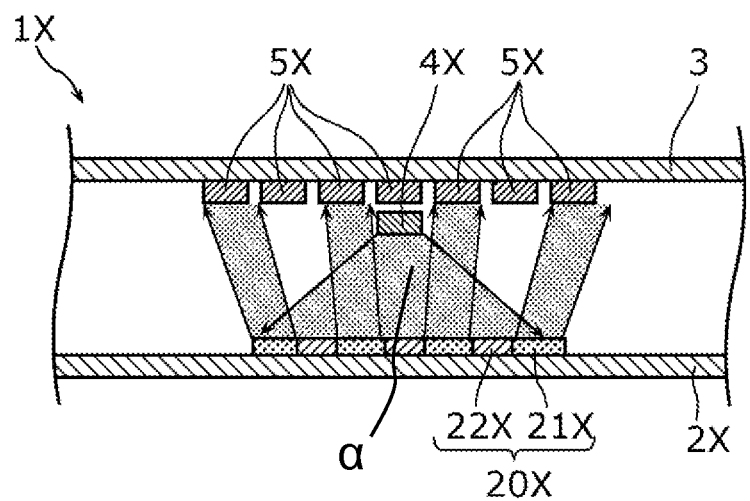
FIG. 5 is a diagram for illustrating operation of an encoder of a light reflection type of a first comparative example.
Figure 6:
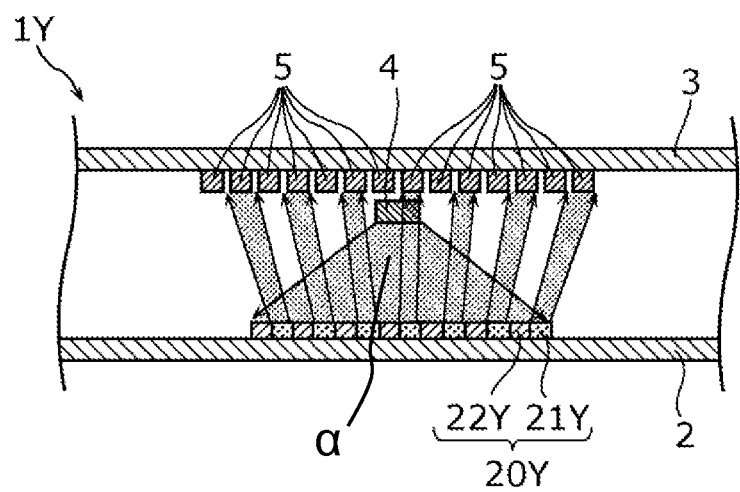
FIG. 6 is a diagram for illustrating operation of an encoder of a light reflection type of a second comparative example.
Figure 7:
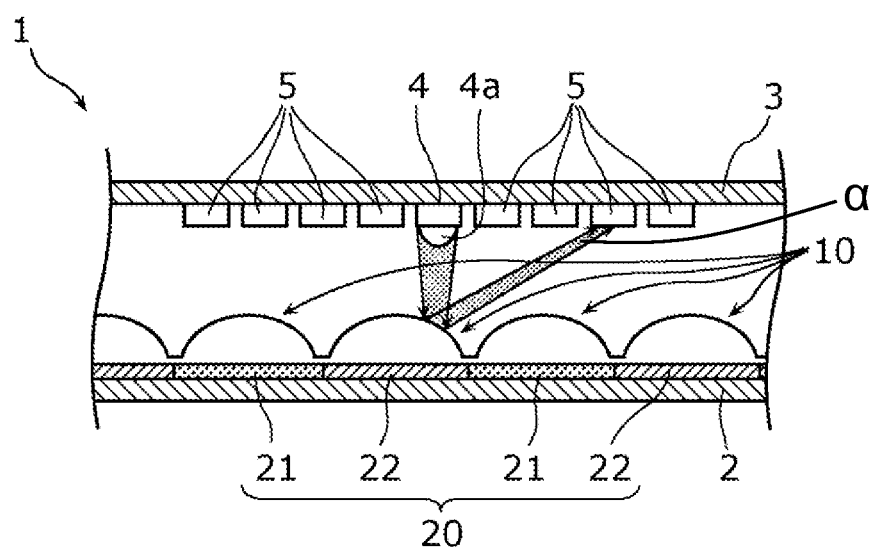
FIG. 7 is a diagram for illustrating operation of the encoder according to the first exemplary embodiment.

Next, effects of encoder 1 according to the present exemplary embodiment will be described in comparison with encoders 1X and 1Y of comparative examples with reference to FIGS. 5, 6, and 7. FIG. 5 is a diagram for illustrating operation of encoder 1X of a light reflection type of a first comparative example. FIG. 6 is a diagram for illustrating operation of encoder 1Y of a light reflection type of a second comparative example. FIG. 7 is a diagram for illustrating operation of encoder 1 according to the first exemplary embodiment.

As illustrated in FIG. 5, encoder 1X, which is a rotary encoder of a light reflection type of the first comparative example, includes rotary plate 2X on which light reflector 21X and non-light reflector 22X are each formed in a predetermined pattern as an incrementer for generating an analog position signal. Encoder 1X of a light reflection type of the first comparative example allows light α emitted from irradiator 4X to be divided by a plurality of light reflectors 21X and incident on light receiver 5X. Thus, the light quantity (light intensity) of light α received by each light receiving element of light receiver 5X decreases in accordance with the number of divisions of the plurality of light reflectors 21X. For example, seven patterns as illustrated in FIG. 5 causes the light quantity of light α received by each light receiving element of light receiver 5X to be reduced to 1/7. That is, detection sensitivity (S/N ratio) of a rotation angle and the like is reduced to 1/7.

In recent years, an encoder of a light reflection type has been studied due to a demand for miniaturization and high position resolution of an encoder. Here, when encoder 1X of a light reflection type having structure illustrated in FIG. 5 is finely divided to achieve high position resolution, it is conceivable to reduce size of each of light reflectors 21X and each of non-light reflectors 22X formed on rotary plate 2X.

For example, to acquire double positional accuracy in comparison with encoder 1X of a light reflection type of the first comparative example illustrated in FIG. 5, light reflector 21Y and non-light reflectors 22Y formed on rotary plate 2Y need to be halved in size in comparison with light reflectors 21X and non-light reflectors 22X in encoder 1X of a light reflection type of the first comparative example illustrated in FIG. 5, as in encoder 1Y of a light reflection type of the second comparative example illustrated in FIG. 6.

However, as illustrated in FIG. 6, light reflector 21Y and non-light reflector 22Y, which are halved in size, cause the amount of reflected light, which is emitted from irradiator 4Y, reflected by a plurality of light reflectors 21Y, and incident on light receiver 5Y, is further halved in comparison with encoder 1X of a light reflection type of the first comparative example of FIG. 5. For example, fourteen patterns as illustrated in FIG. 6 causes the light quantity of light α received by each light receiving element of light receiver 5Y to be reduced to 1/14. That is, detection sensitivity (S/N ratio) of a rotation angle and the like is reduced to 1/14.

As described above, the structure of the conventional rotary encoder of a light reflection type causes light emitted from an irradiator to be divided by a plurality of light reflectors and received by a light receiver, so that as the light reflectors and the non-light reflectors are formed more finely, the number of divisions of the light emitted from the irradiator increases. As a result, the light quantity received by the light receiver decreases, and thus detection sensitivity of a rotation angle and the like deteriorates or the rotation angle cannot be detected in some cases.

Additionally, to use light reflectors 21Y and non-light reflectors 22Y that are finely formed as in encoder 1Y, which is a rotary encoder of a light reflection type of the second comparative example of FIG. 6, light reflectors 21Y and non-light reflectors 22Y are required to have higher accuracy of position and shape. That is, deterioration in accuracy of position or shape of light reflectors 21Y and non-light reflectors 22Y causes deterioration in detection accuracy of a rotation angle of rotary plate 2. Additionally, an advanced manufacturing technique may be required to accurately form light reflectors 21Y formed finely. That is, light reflectors 21Y formed finely are less likely to be accurately formed.

As a result of intensive studies by the inventors of the present application on such problems, encoder 1 having the structure illustrated in FIGS. 1 to 4 has been obtained. Specifically, encoder 1 according to the present exemplary embodiment is configured such that the plurality of reflection structures 10 each having a concave surface and code 20 including light reflector 21 are formed on rotary plate 2 as illustrated in FIG. 7, and each of the plurality of reflection structures 10 has a width that is an integral multiple of a width of light reflector 21 (unit code pattern). Specifically, each of the plurality of reflection structures 10 has the width that is one time the width of light reflector 21.

This structure enables change in position of one reflection structure 10 due to rotation of rotary plate 2 to be converted by a reflection angle by a convex reflection surface of reflection structure 10, so that the amount of movement of one reflection structure 10 (i.e., the amount of movement of rotary plate 2) can be enlarged by an angular amount of reflected light of reflection structure 10. Thus, this structure enables a position at which light α reflected by reflection structure 10 reaches light receiver 5 to be greatly changed when reflection structure 10a is slightly changed in position by rotation of rotary plate 2. As described above, the present exemplary embodiment allows a position of rotary plate 2 relative to fixing part 3 to be detected using a position of received reflected light instead of the amount of received reflected light. Specifically, the present exemplary embodiment allows light receiver 5 to include a plurality of light receiving elements, so that a rotation angle (position movement) of rotary plate 2 is detected in accordance with a position of each light receiving element.

Encoder 1 according to the present exemplary embodiment also allows all of first light directed to reflection structure 10, the first light being included in light α emitted from irradiator 4, to be incident on one light receiving element of light receiver 5 while the first light is not divided by the number of unit code patterns of code 20. Specifically, light α emitted from irradiator 4 is concentrated on one light receiving element by light collecting member 4a.

As described above, the present exemplary embodiment forms a structure in which light α emitted from irradiator 4 includes first light directed to reflection structure 10, the first light being concentrated on a reflection curved surface of reflection structure 10 of rotary plate 2, and thus light α emitted from irradiator 4 has only one incident angle with respect to the unit code pattern of code 20. Light α emitted from irradiator 4 also includes second light directly directed to code 20, the second light being reflected by code 20 and directed to light receiver 5. Thus, the entire light quantity of the light emitted from irradiator 4 can be received by light receiver 5 and high angular resolution can be obtained, so that high detection sensitivity (S/N ratio) can be obtained. For example, code 20 having seven patterns as illustrated in FIG. 5 causes the light quantity of light received by each light receiving element of light receiver 5 to be 7/7. That is, detection sensitivity (S/N ratio) of a rotation angle and the like is 7/7=1. Then, code 20 having fourteen patterns as illustrated in FIG. 6 causes the light quantity of light received by each light receiving element of light receiver 5 to be 14/14. That is, detection sensitivity (S/N ratio) of a rotation angle and the like is 14/14=1. Additionally, code 20 having eleven patterns as illustrated in FIG. 1 causes the light quantity of light received by each light receiving element of light receiver 5 to be 11/11. That is, detection sensitivity of a rotation angle and the like is 11/11=1.

As described above, encoder 1 according to the present exemplary embodiment is capable of achieving high position resolution without being finely divided, and capable of detecting a rotation angle or the like with high sensitivity.

Then, encoder 1 according to the present exemplary embodiment includes the plurality of reflection structures 10 provided over the entire circumference of rotary plate 2 along the rotation direction of rotary plate 2, and code 20 provided adjacent to the plurality of reflection structures 10.

This structure enables a rotation angle and the like to be accurately detected. This structure also enables not only one irradiator 4 to irradiate the plurality of reflection structures 10 and code 20 with light, but also light receiver 5 to efficiently receive reflected light of the plurality of reflection structures 10 and code 20.

First Modification of First Exemplary Embodiment

Although encoder 1 illustrated in FIGS. 1 to 4 includes the plurality of reflection structures 10 each of which has a convex surface, the present invention is not limited thereto.

Figure 8A:
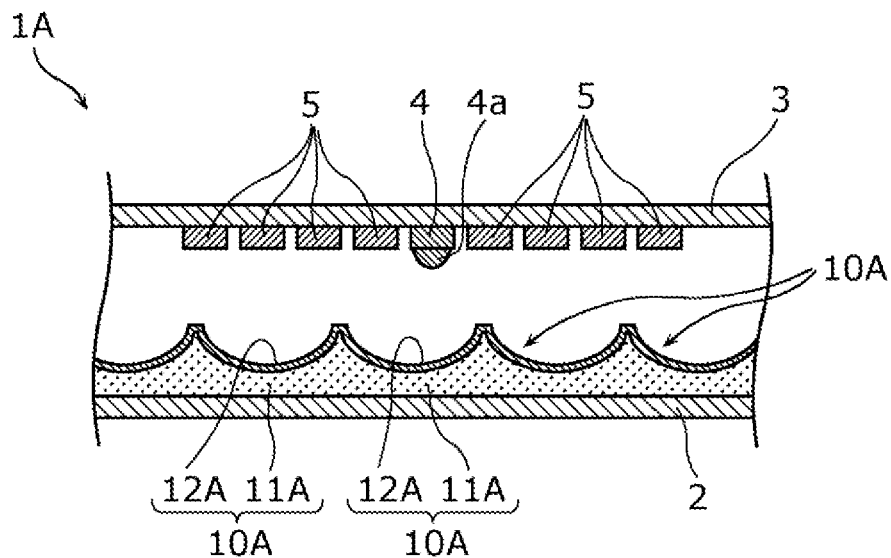
FIG. 8A is a partially enlarged sectional view of an encoder according to a first modification of the first exemplary embodiment.
Figure 8B:
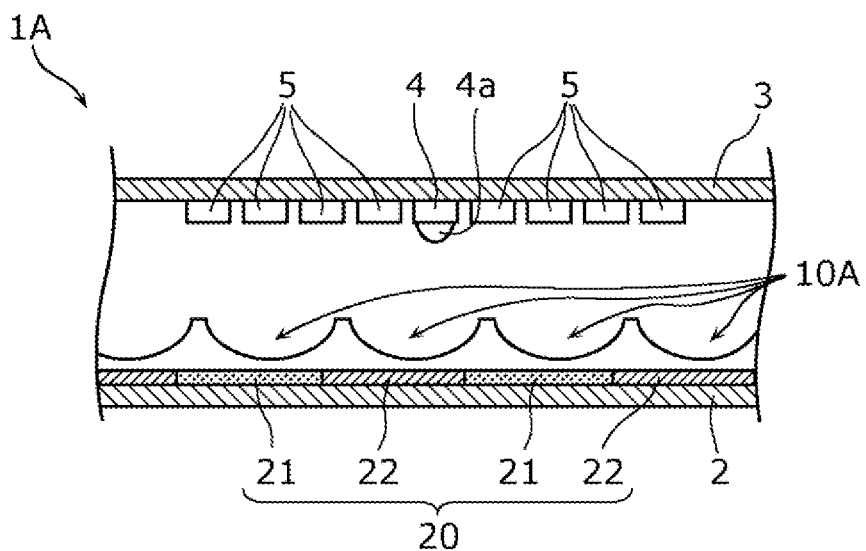
FIG. 8B is a partially enlarged sectional view of the encoder according to the first modification of the first exemplary embodiment.

For example, each of a plurality of reflection structures 10A may have a concave surface as in encoder 1A illustrated in FIGS. 8A and 8B. FIGS. 8A and 8B are each a partially enlarged sectional view of encoder 1A according to a first modification of the first exemplary embodiment. FIGS. 8A and 8B illustrate parts corresponding to FIGS. 3A and 3B, respectively, FIGS. 3A and 3B illustrating the structure of encoder 1.

As illustrated in FIGS. 8A and 8B, encoder 1A according to the present modification includes the plurality of reflection structures 10A each of which has a surface formed as a concave light reflection surface. As an example, each reflection structure 10A has the surface formed as a cylindrical surface convex downward.

Specifically, each of the plurality of reflection structures 10A includes concave part 11A having the cylindrical surface convex downward, and light reflection layer 12A formed on the surface of concave part 11A. The plurality of reflection structures 10A include respective concave parts 11A that are integrated, but the present invention is not limited thereto. The plurality of reflection structures 10A also include respective light reflection layers 12A that are integrated, but the present invention is not limited thereto. Materials of concave part 11A and light reflection layer 12A are respectively similar to those of convex part 11 and light reflection layer 12 of reflection structure 10 in encoder 1 described above.

Structure of encoder 1A other than the structure described above is similar to that of encoder 1 above. Thus, encoder 1A according to the present modification includes the plurality of reflection structures 10A each of which has a width (width in the column direction) of an integral multiple of a width (width in the column direction) of light reflector 21 of code 20 as illustrated in FIG. 8B, as with encoder 1 illustrated in FIG. 3. Specifically, one reflection structure 10A and one light reflector 21, and one reflection structure 10A and one non-light reflector 22, which are aligned in the radial direction of rotary plate 2, are equal in width.

Figure 9:
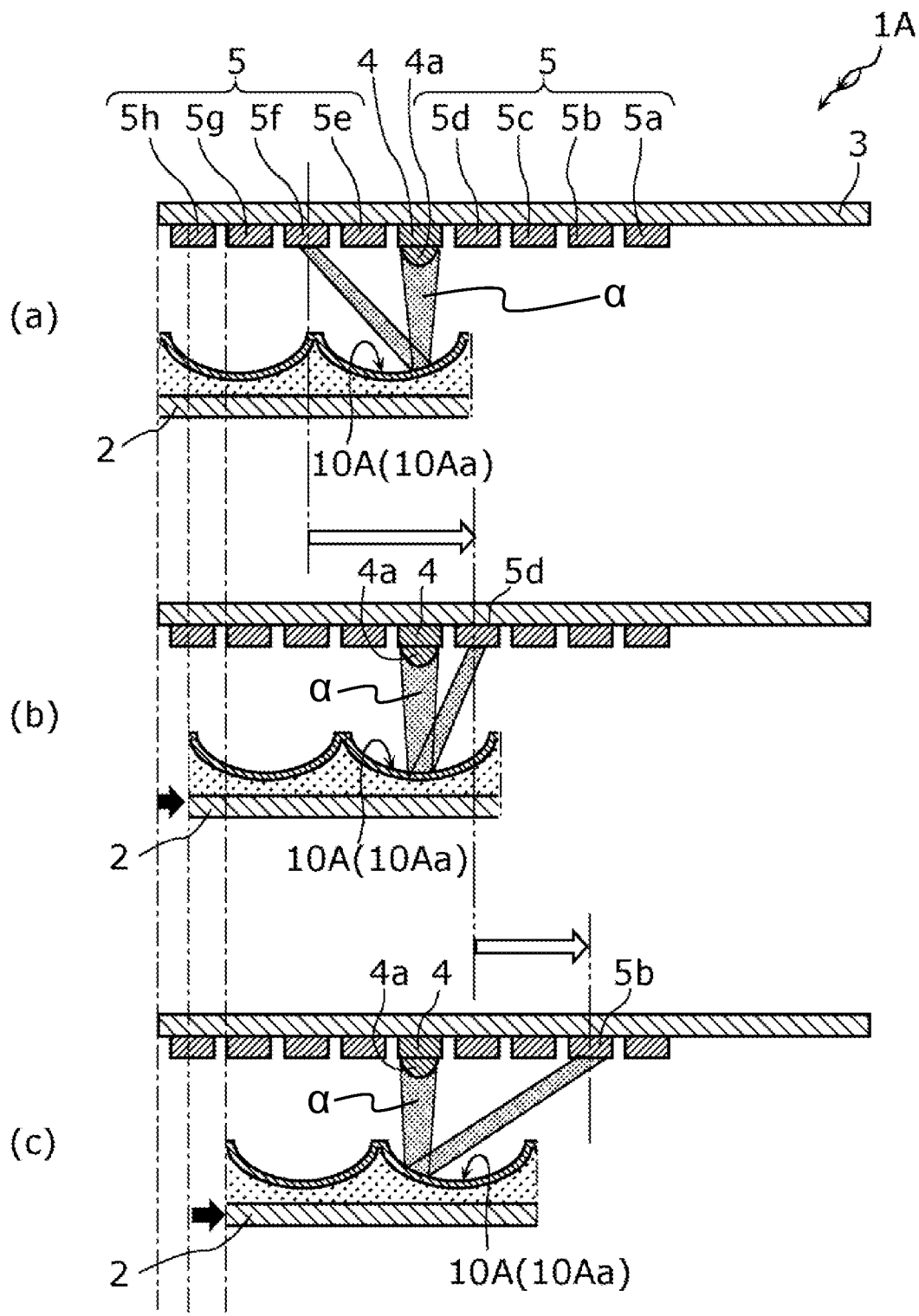
FIG. 9 is a diagram for illustrating operation of the encoder according to the first modification of the first exemplary embodiment.

Encoder 1A formed as described above operates as illustrated in FIG. 9. FIG. 9 is a diagram for illustrating operation of encoder 1A according to the first modification of the first exemplary embodiment. FIG. 9 illustrates only a part of rotary plate 2. FIG. 9 illustrates eight light receiving elements 5a to 5h as light receiver 5.

Even in the present modification, when irradiator 4 emits light α toward rotary plate 2 rotating, light α emitted from irradiator 4 is sequentially reflected by the plurality of reflection structures 10A disposed side by side in the rotation direction and received by light receiver 5. At this time, when attention is paid to one reflection structure 10Aa of the plurality of reflection structures 10A as illustrated in FIG. 9, reflection structure 10Aa has a concave reflection surface. Thus, as rotary plate 2 rotates, reflection structure 10Aa changes in position relative to irradiator 4. Then, light α emitted from irradiator 4 and having reached reflection structure 10Aa is reflected at a reflection angle according to a curvature of the reflection surface of reflection structure 10Aa, and then is sequentially incident on eight light receiving elements 5a to 5h of light receiver 5.

Specifically, as rotary plate 2 rotates to change reflection structure 10Aa in position in the order of (a), (b), and (c) in FIG. 9 as indicated by black block arrows in FIG. 9, light α reflected by reflection structure 10Aa and incident on light receiver 5 changes in position as indicated by white block arrows in FIG. 9. That is, light α emitted from irradiator 4 and reflected by reflection structure 10Aa is incident on: light receiving element 5f when reflection structure 10Aa is located at a position in part (a) of FIG. 9; light receiving element 5d when reflection structure 10Aa is located at a position in part (b) of FIG. 9; and light receiving element 5b when reflection structure 10Aa is located at a position in part (c) of FIG. 9.

As described above, encoder 1A according to the present modification includes the plurality of reflection structures 10A each having a concave surface. Thus, light α reflected by reflection structure 10Aa and having reached light receiver 5 can be greatly changed in position as indicated by the white block arrows in FIG. 9 when reflection structure 10Aa is slightly changed in position by rotation of rotary plate 2 as indicated by the black block arrows in FIG. 9.

Even encoder 1A according to the present modification allows all of light α emitted from irradiator 4 to be incident on one light receiving element of light receiver 5 while light α is not divided by the number of unit code patterns of code 20. As a result, the entire light quantity of the light emitted from irradiator 4 can be received by light receiver 5, so that high detection sensitivity (S/N ratio) can be obtained.

Thus, even encoder 1A according to the present modification is capable of achieving high position resolution without being finely divided, and capable of detecting a rotation angle or the like with high sensitivity, as with encoder 1 above.

Additionally, when the plurality of reflection structures 10A each have a surface formed in a concave shape as in encoder 1A according to the present modification, light α emitted from irradiator 4 can be concentrated on one light receiving element without using light collecting member 4a. That is, effects as in encoder 1 above can be obtained without using light collecting member 4a.

As illustrated in FIGS. 8A and 8B, light collecting member 4a may also be used in encoder 1A according to the present modification as with encoder 1 above. As a result, light α emitted from irradiator 4 can be accurately concentrated on one light receiving element, so that a rotation angle and the like can be detected with higher sensitivity.

Second Modification of First Exemplary Embodiment

Figure 10:
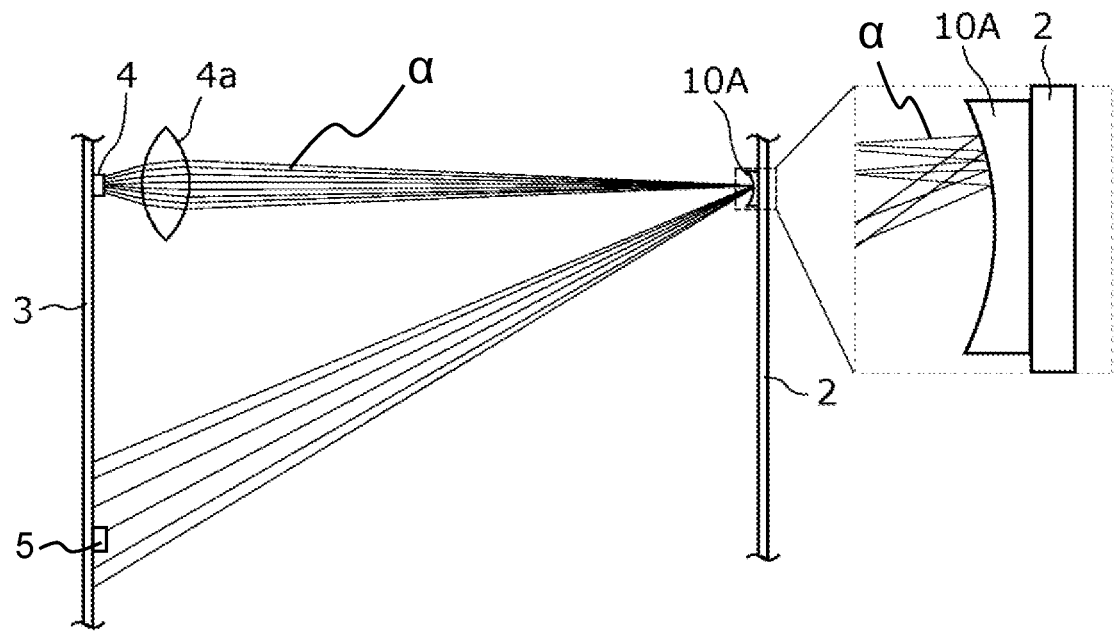
FIG. 10 is an enlarged view illustrating an irradiator and one reflection structure in the encoder according to the first modification of the first exemplary embodiment.
Figure 11:
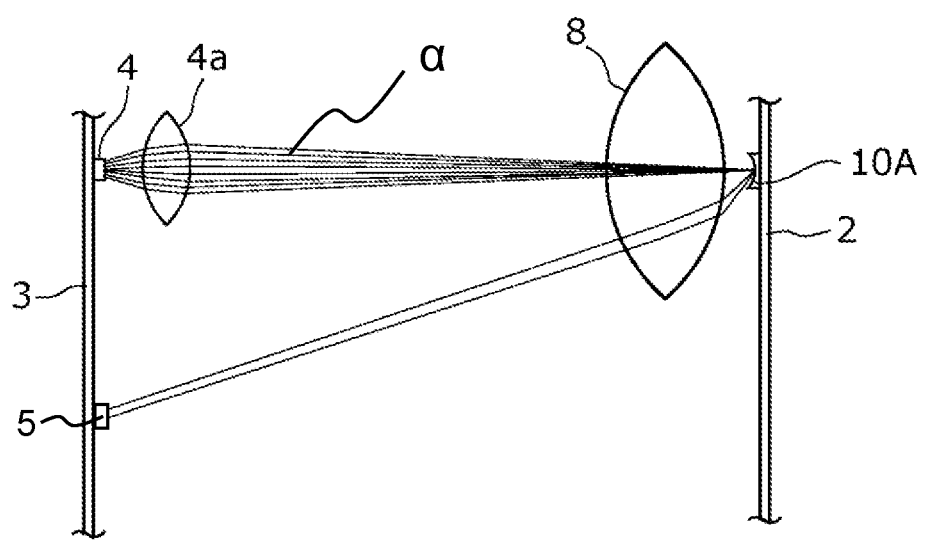
FIG. 11 is an enlarged view illustrating an irradiator and one reflection structure in an encoder according to a second modification of the first exemplary embodiment.

FIG. 10 is an enlarged view illustrating irradiator 4 and one reflection structure 10A in the encoder according to the first modification of the first exemplary embodiment. FIG. 11 is an enlarged view illustrating irradiator 4 and one reflection structure 10A in an encoder according to a second modification of the first exemplary embodiment.

As illustrated in FIG. 10, even when light collecting member 4a is used, light emitted from irradiator 4 and reflected by reflection structure 10A may not be concentrated on light receiver 5 depending on various design parameters.

Thus, convex lens 8 (condensing lens) that concentrates light reflected by reflection structure 10A toward light receiver 5 may be disposed as illustrated in FIG. 11. As a result, light emitted from irradiator 4 and reflected by each reflection structure 10A can be efficiently concentrated on light receiver 5, so that light density on light receiver 5 can be increased. Thus, detection sensitivity (SN ratio) of a rotation angle and the like can be further increased.

Convex lens 8 not only is used in encoder 1A including reflection structure 10A in a concave shape, but also may be applied to encoder 1 according to the first exemplary embodiment illustrated in FIGS. 1 to 3B. Convex lens 8 may be applied to a second exemplary embodiment below.

Second Exemplary Embodiment

Figure 12A:
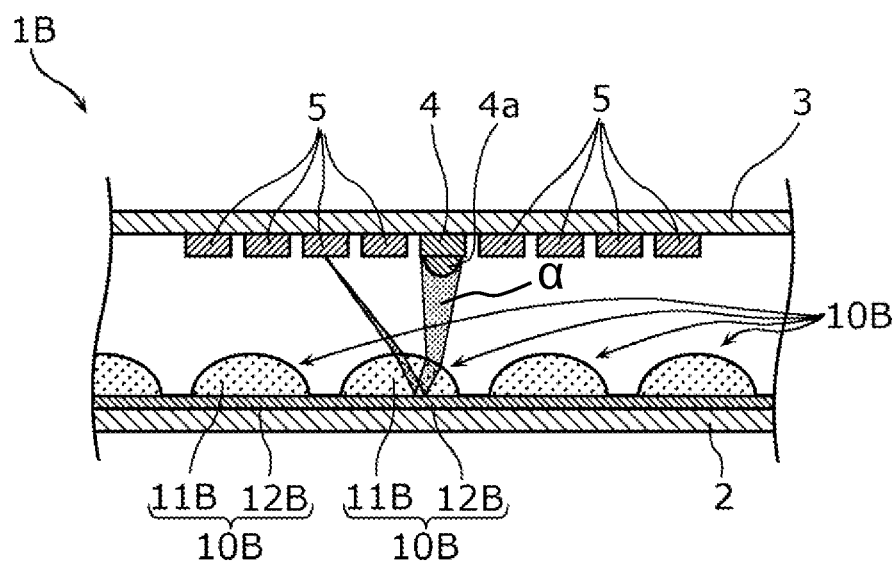
FIG. 12A is a partially enlarged sectional view of an encoder according to a second exemplary embodiment.
Figure 12B:
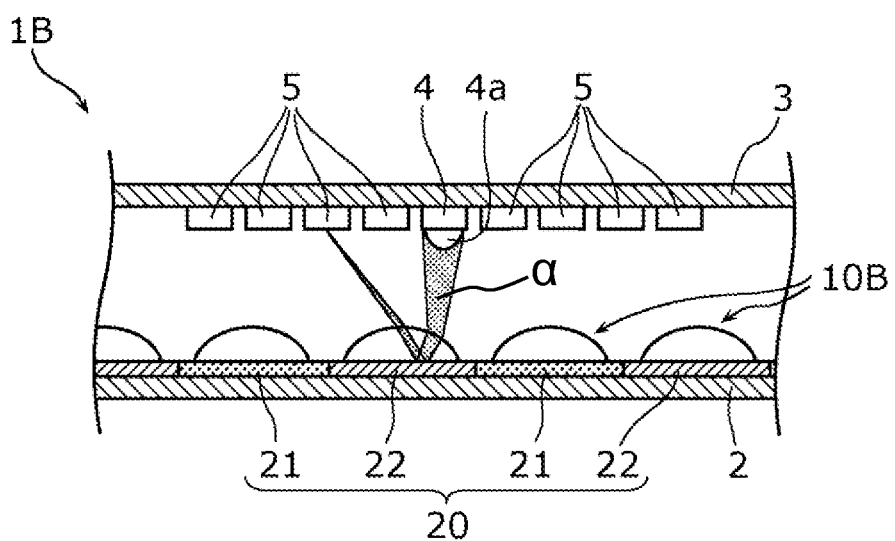
FIG. 12B is a partially enlarged sectional view of the encoder according to the second exemplary embodiment.

Next, encoder 1B according to the second exemplary embodiment will be described with reference to FIGS. 12A and 12B. FIGS. 12A and 12B are each a partially enlarged sectional views of encoder 1B according to the second exemplary embodiment. FIGS. 12A and 12B illustrate parts corresponding to FIGS. 3A and 3B, respectively, FIGS. 3A and 3B illustrating the structure of encoder 1 according to the first exemplary embodiment.

Although encoder 1 according to the first exemplary embodiment includes the plurality of reflection structures 10 each of which includes convex part 11 and light reflection layer 12 formed on convex part 11, encoder 1B according to the present exemplary embodiment includes a plurality of reflection structures 10B each of which includes light reflection layer 12B and convex lens 11B provided on light reflection layer 12B as illustrated in FIGS. 12A and 12B. That is, each reflection structure 10B in the present exemplary embodiment has a surface that is not a light reflection surface but a surface of convex lens 11B. Each reflection structure 10B has a light reflection surface that is a surface of light reflection layer 12B, i.e., an interface between light reflection layer 12B and convex lens 11B.

Convex lens 11B has a semi-columnar shape with an axis in the radial direction of rotary plate 2. Thus, convex lens 11B has a surface (light reflecting surface) formed as a cylindrical surface convex upward. Convex lens 11B is made of a transparent material such as a transparent resin material or a transparent glass material.

Light reflection layer 12B is a light reflection film that is constant in thickness and made of a material similar to that of light reflection layer 12 of encoder 1 in the first exemplary embodiment while having light reflection characteristics as in light reflection layer 12. Light reflection layer 12B in the present exemplary embodiment has a surface (light reflection surface) formed as a flat surface.

Each of the plurality of reflection structures 10B formed as described above has a surface formed as a cylindrical surface convex upward. The plurality of reflection structures 10B include respective convex lenses 11B that are integrated, but the present invention is not limited thereto. The plurality of reflection structures 10B also include respective light reflection layers 12B that are integrated, but the present invention is not limited thereto. Materials of convex lens 11B and light reflection layer 12B are respectively similar to those of convex part 11 and light reflection layer 12 of reflection structure 10 in encoder 1 according to the first exemplary embodiment. Even in the present exemplary embodiment, the plurality of reflection structures 10B have a shape as a whole in which concavity and convexity are repeated along the circumferential direction of rotary plate 2.

Structure of encoder 1B other than the structure described above is similar to that of encoder 1 according to the first exemplary embodiment. Thus, encoder 1B according to the present exemplary embodiment includes the plurality of reflection structures 10B each of which has a width (width in the column direction) of an integral multiple of a width (width in the column direction) of light reflector 21 of code 20 as illustrated in FIG. 12B, as with encoder 1 according to the first exemplary embodiment. Specifically, one reflection structure 10B and one light reflector 21, and one reflection structure 10B and one non-light reflector 22, which are aligned in the radial direction of rotary plate 2, are equal in width even in the present exemplary embodiment.

Encoder 1B formed as described above operates similarly to encoder 1 in the first exemplary embodiment illustrated in FIG. 4. That is, even in the present exemplary embodiment, when irradiator 4 emits light α toward rotary plate 2 rotating, light α emitted from irradiator 4 is sequentially reflected by the plurality of reflection structures 10B disposed side by side in the rotation direction and received by light receiver 5.

In this case, each of the plurality of reflection structures 10B includes light reflection layer 12B and convex lens 11B in the present exemplary embodiment, so that light α emitted from irradiator 4 and incident on reflection structure 10B passes through convex lens 11B and is reflected on the surface of light reflection layer 12B, and then passes through convex lens 11B again to be emitted to the outside. At this time, the light incident on convex lens 11B and the light emitted from convex lens 11B travel after refraction on an outer surface of convex lens 11B (an interface between convex lens 11B and the air layer). Light α emitted from convex lens 11B is incident on light receiver 5 as reflected light from reflection structure 10B.

Even in the present exemplary embodiment, as rotary plate 2 rotates, reflection structure 10B changes in position relative to irradiator 4. Then, light α emitted from irradiator 4 and having reached reflection structure 10B is reflected at a reflection angle according to a curvature of a reflection surface of reflection structure 10B, and then is sequentially incident on a plurality of light receiving elements of light receiver 5.

As described above, even encoder 1B according to the present exemplary embodiment includes the plurality of reflection structures 10B each having a convex surface. Thus, light reflected by reflection structure 10B and having reached light receiver 5 can be greatly changed in position when reflection structure 10B is slightly changed in position by rotation of rotary plate 2. As described above, even the present exemplary embodiment allows a position of rotary plate 2 relative to fixing part 3 to be detected using a position of received reflected light instead of the amount of received reflected light. Specifically, even the present exemplary embodiment allows light receiver 5 to include a plurality of light receiving elements, so that a rotation angle (position movement) of rotary plate 2 is detected in accordance with a position of each light receiving element.

Even encoder 1B according to the present exemplary embodiment allows all of light emitted from irradiator 4 to be incident on a light receiving element of light receiver 5 while the light is not divided by the number of unit code patterns of code 20. As a result, the entire light quantity of one light beam of light α emitted from irradiator 4 can be received by light receiver 5 and high angular resolution can be obtained, so that high detection sensitivity (S/N ratio) can be obtained.

Thus, even encoder 1B according to the present exemplary embodiment is capable of achieving high position resolution without being finely divided, and capable of detecting a rotation angle or the like with high sensitivity, as with encoder 1 according to the first exemplary embodiment.

Modification of Second Exemplary Embodiment

Although encoder 1B illustrated in FIGS. 12A and 12B includes reflection structures 10B each of which is composed of light reflection layer 12B having a flat surface and convex lens 11B, the present invention is not limited thereto.

Figure 13A:
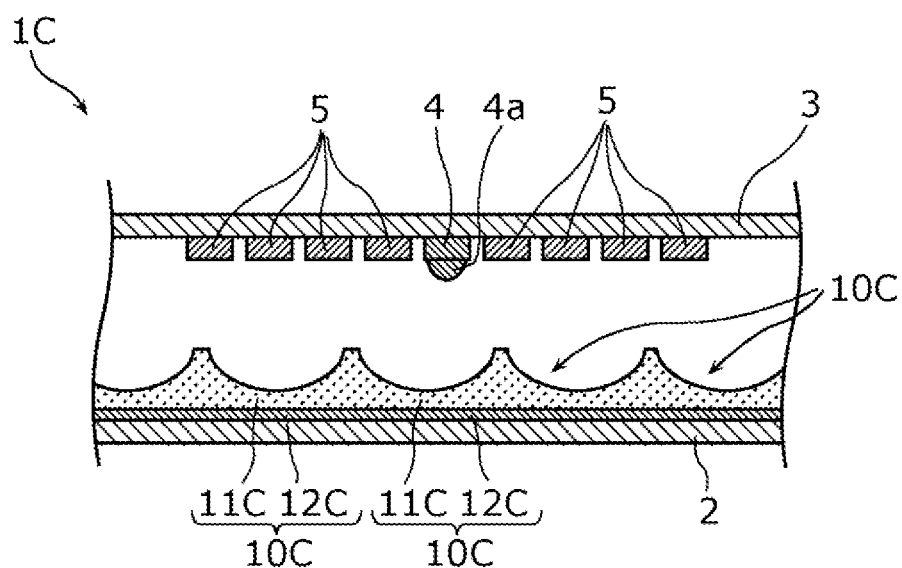
FIG. 13A is a partially enlarged sectional view of an encoder according to a modification of the second exemplary embodiment.
Figure 13B:
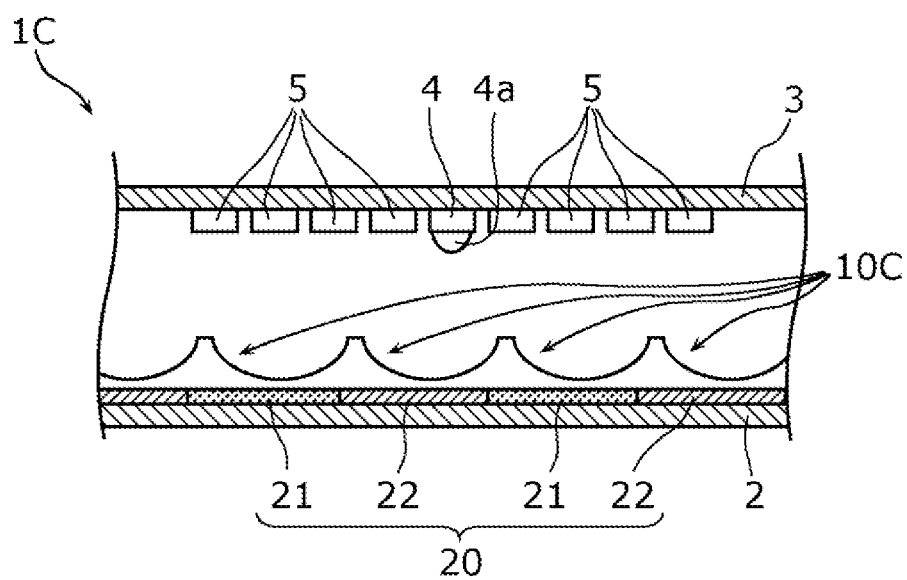
FIG. 13B is a partially enlarged sectional view of the encoder according to the modification of the second exemplary embodiment.

For example, a plurality of reflection structures 10C each may be composed of light reflection layer 12C having a flat surface and concave lens 11C provided on light reflection layer 12C as in encoder 1C illustrated in FIGS. 13A and 13B. FIGS. 13A and 13B are each a partially enlarged sectional view of encoder 1C according to a modification of the second exemplary embodiment. FIGS. 13A and 13B illustrate parts corresponding to FIGS. 3A and 3B, respectively, FIGS. 3A and 3B illustrating the structure of encoder 1.

FIGS. 13A and 13B illustrate encoder 1C in which each reflection structure 10C has a surface that is a surface of concave lens 11C. Specifically, the surface of concave lens 11C is formed as a cylindrical surface convex downward. The plurality of reflection structures 10C include respective concave lenses 11C that are integrated, but the present invention is not limited thereto. Concave lens 11C is made of a material similar to that of convex lens 11B of reflection structure 10B in encoder 1B above. Light reflection layer 12C is identical in shape and material to light reflection layer 12B of reflection structure 10B in encoder 1B above.

Structure of encoder 1C other than the structure described above is similar to that of encoder 1B above. Thus, encoder 1C according to the present exemplary embodiment includes the plurality of reflection structures 10C each of which has a width (width in the column direction) of an integral multiple of a width (width in the column direction) of light reflector 21 of code 20 as illustrated in FIG. 13B, as with encoder 1B above. Specifically, one reflection structure 10C and one light reflector 21, and one reflection structure 10C and one non-light reflector 22, which are aligned in the radial direction of rotary plate 2, are equal in width even in the present exemplary embodiment.

Encoder 1C formed as described above operates similarly to encoder 1B in the second exemplary embodiment. That is, even in the present modification, when irradiator 4 emits light toward rotary plate 2 rotating, the light emitted from irradiator 4 is sequentially reflected by the plurality of reflection structures 10C disposed side by side in the rotation direction and received by light receiver 5.

In this case, each of the plurality of reflection structures 10C includes light reflection layer 12C and concave lens 11C in the present modification, so that light emitted from irradiator 4 and incident on reflection structure 10C passes through concave lens 11C and is reflected on a surface of light reflection layer 12C, and then passes through concave lens 11C again to be emitted to the outside. At this time, the light incident on concave lens 11C and the light emitted from concave lens 11C travel after refraction on an outer surface of concave lens 11C (an interface between concave lens 11C and the air layer). The light emitted from concave lens 11C is incident on light receiver 5 as reflected light from reflection structure 10C.

Even in the present modification, as rotary plate 2 rotates, reflection structure 10C changes in position relative to irradiator 4. Then, the light emitted from irradiator 4 and having reached reflection structure 10C is reflected at a reflection angle according to a curvature of a reflection surface of reflection structure 10C, and then is sequentially incident on a plurality of light receiving elements of light receiver 5.

As described above, even encoder 1C according to the present modification includes multiple reflection structures 10C each having a concave surface. Thus, light reflected by reflection structure 10C and having reached light receiver 5 can be greatly changed in position when reflection structure 10C is slightly changed in position by rotation of rotary plate 2.

Even encoder 1C according to the present modification allows all of light emitted from irradiator 4 to be incident on a light receiving element of light receiver 5 while the light is not divided by the number of unit code patterns of code 20. As a result, the entire light quantity of one light beam of the light emitted from irradiator 4 can be received by light receiver 5 and high angular resolution can be obtained, so that high detection sensitivity (S/N ratio) can be obtained.

Thus, even encoder 1C according to the present modification is capable of achieving high position resolution without being finely divided, and capable of detecting a rotation angle or the like with high sensitivity, as with encoder 1 according to the first exemplary embodiment.

Additionally, when multiple reflection structures 10C each have a surface formed in a concave shape as in encoder 1C according to the present modification, light emitted from irradiator 4 can be concentrated on one light receiving element without using light collecting member 4a. That is, effects as in encoder 1B according to the second exemplary embodiment can be obtained without using light collecting member 4a.

As illustrated in FIGS. 13A and 13B, light collecting member 4a may also be used in encoder 1C according to the present modification as with encoder 1B according to the second exemplary embodiment. As a result, light emitted from irradiator 4 can be accurately concentrated on one light receiving element, so that a rotation angle and the like can be detected with higher sensitivity.

(Modifications)

Although the encoder according to the present disclosure has been described above based on the exemplary embodiments, the present disclosure is not limited to the above-described exemplary embodiments.

Figure 14:
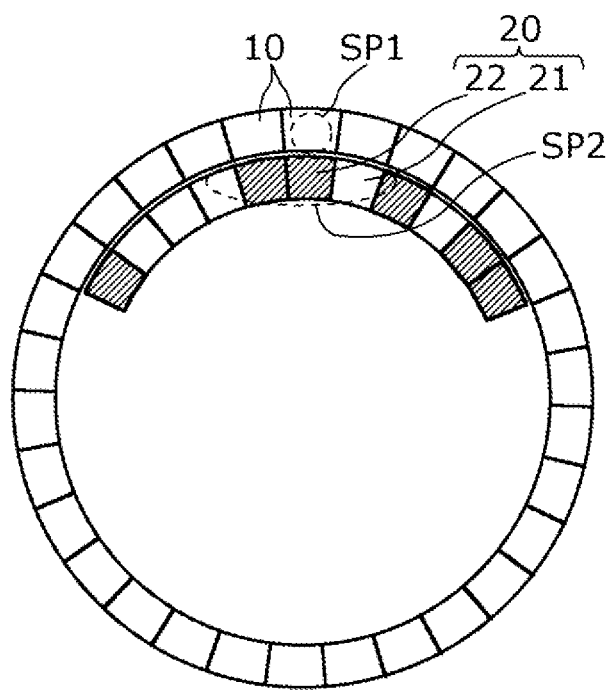
FIG. 14 is a diagram illustrating structure of an encoder according to a modification.

For example, although the first and second exemplary embodiments include irradiator 4 that irradiates a light spot (light irradiation region) with light, the light spot extending over reflection structure 10 to 10C and code 20, the present disclosure is not limited to this. Specifically, irradiator 4 may individually irradiate reflection structure 10 and code 20 with light, reflection structure 10 and code 20 each serving as a separate light spot as illustrated in FIG. 14. In this case, irradiator 4 may include a first light emitting element that irradiates reflection structure 10 with light at first spot SP1, and a second light emitting element that irradiates code 20 with light at second spot SP2, for example. As described above, irradiating reflection structure 10 and code 20 with light at respective separate light spots enables position resolution of reflection structure 10 and code 20 to be enhanced.

Figure 15:
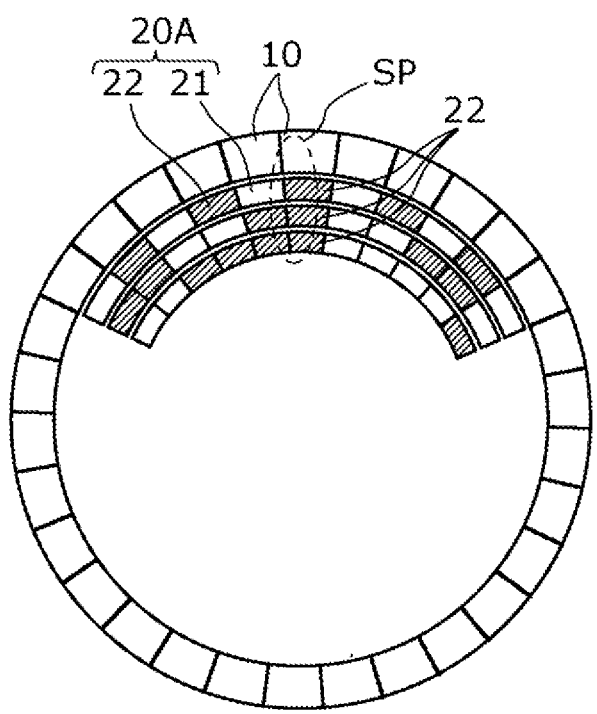
FIG. 15 is a diagram illustrating structure of an encoder according to another modification.

Although the first and second exemplary embodiments include code 20 in which one or more light reflectors 21 and one or more non-light reflectors 22 are formed in a line, the present disclosure is not limited to this. As illustrated in FIG. 15, code 20A may include one or more light reflectors 21 and one or more non-light reflectors 22 that are formed in a plurality of rows (three rows in FIG. 15), for example. In this case, irradiator 4 may irradiate light spot SP with light, light spot SP extending over reflection structure 10 and the plurality of rows of unit code patterns of code 20A as illustrated in FIG. 15. Alternatively, irradiator 4 may individually irradiate reflection structure 10 and the plurality of rows of unit code patterns of code 20A with light. As code 20A with the plurality of rows, a Gray code or the like can be used. Although the present specification describes a method for designating an absolute position using an M code, a Gray code, or the like, another method may be used.

Although the first and second exemplary embodiments each describe the rotary encoder as an example, the present invention is not limited thereto. The technique of the present disclosure can also be applied to a linear encoder. In this case, a board that moves linearly is used instead of rotary plate 2, and reflection structure 10 and code 20 are formed on the board.

Although the first and second exemplary embodiments include code 20 that is composed of light reflector 21 and non-light reflector 22, the present disclosure is not limited to this. For example, code 20 may be composed of a light transmissive part that transmits light and a non-light transmissive part that does not transmit light. In this case, each of the plurality of reflection structures 10 has a width that is an integral multiple (e.g., one time) of a width of the light transmissive part or a width of the non-light transmissive part in code 20.

The encoder according to each of the first and second exemplary embodiments may include a power supply circuit, a battery, or the like, or may include no battery. When the encoder includes no battery, the encoder may be a battery-less encoder provided with a power generation element.

The present disclosure includes other exemplary embodiments such as an exemplary embodiment that is obtained by making various modifications conceived by those skilled in the art to each exemplary embodiment described above, and an exemplary embodiment that is implemented by freely combining components and functions in each exemplary embodiment without departing from the spirit of the present disclosure.

INDUSTRIAL APPLICABILITY

The encoder according to the present disclosure is useful for apparatuses or devices that rotate or linearly move, such as motors.

REFERENCE MARKS IN THE DRAWINGS 1, 1A, 1B, 1C, 1X, 1Y: encoder
2, 2X, 2Y: rotary plate
3: fixing part
4, 4X, 4Y: irradiator
4a: light collecting member
5, 5X, 5Y: light receiver
5a, 5b, 5c, 5d, 5e, 5f, 5g, 5h: light receiving element
6: processor
7: rotary shaft
8: convex lens
10, 10a, 10A, 10Aa, 10B, 10C: reflection structure
11: convex part
11A: concave part
11B: convex lens
11C: concave lens
12, 12A, 12B, 12C: light reflection layer
20, 20A: code
21, 21X, 21Y: light reflector
22, 22X, 22Y: non-light reflector
α: light

The invention claimed is:

1. An encoder comprising:
   a board that rotates or moves linearly, the board including a plurality of reflection structures and a code including a light reflector or a light transmissive part and disposed adjacent to the plurality of reflection structures in a plan view of the board;
   an irradiator that irradiates the plurality of reflection structures with light to be reflected on the plurality of reflection structures; and
   a light receiver that receives the light reflected on the plurality of reflection structures, wherein:
   each of the plurality of reflective structures has a surface in a convex or concave shape, and
   each of the plurality of reflection structures has a width that is an integral multiple of a width of the light reflector or the light transmissive part.

2. The encoder according to claim 1, wherein each of the plurality of reflection structures has a width that is one time the width of the light reflector or the light transmissive part.

3. The encoder according to claim 1, wherein the surface is a light reflection surface in a convex or concave shape.

4. An encoder comprising:
a board that rotates or moves linearly, the board including a plurality of reflection structures and a code including a light reflector or a light transmissive part;
an irradiator that irradiates the plurality of reflection structures with light to be reflected on the plurality of reflection structures; and
a light receiver that receives the light reflected on the plurality of reflection structures, wherein:
each of the plurality of reflective structures has a surface in a convex or concave shape,
each of the plurality of reflection structures includes a light reflection layer disposed on a surface of a convex lens or a surface of a concave lens provided on the board and
a surface of the light reflection layer is in a convex or concave shape.

5. The encoder according to claim 1, further comprising a light concentrating member that concentrates the light emitted from the irradiator toward each of the plurality of reflection structures.

6. The encoder according to claim 5, wherein the light concentrating member is a convex lens.

7. The encoder according to claim 1, further comprising a lens that concentrates light reflected by the plurality of reflection structures toward the light receiver.

8. The encoder according to claim 1, wherein the light receiver includes a plurality of light receiving elements.

9. The encoder according to claim 8, further comprising a processor connected to the light receiver,
wherein the processor is configured to calculate information on a change in position of the board based on light receiving positions of the plurality of light receiving elements.

10. The encoder according to claim 1, wherein the code comprises an M code.

11. The encoder according to claim 1, wherein the board is a rotary plate.

12. The encoder according to claim 11, wherein the code is provided along a circumferential direction of the rotary plate.

13. The encoder according to claim 12, wherein:
the plurality of reflection structures are provided over an entire circumference of the rotary plate along a rotation direction of the rotary plate
the code is provided adjacent to the plurality of reflection structures in a radial direction of the rotary plate in a plan view of the rotary plate.

14. The encoder according to claim 12, wherein the code is provided at a position closer to a center of the rotary plate than the plurality of reflection structures are.

15. The encoder according to claim 4, wherein the light reflection layer is made of a metallic material.

16. The encoder according to claim 15, wherein each of the convex lens and the concave lens are made of a resin material or glass.

17. The encoder according to claim 4, wherein the light reflection layer is integrally formed as one continuous light reflection film over multiple convex lenses or concave lenses.

18. The encoder according to claim 17, wherein a surface of the light reflection layer comprises a convex or concave shape.

19. The encoder according to claim 4, wherein the light reflection layer is a single-layer light reflection film.

20. The encoder according to claim 4, wherein the light reflection layer is a layered film in which the plurality of light reflection films are layered.

21. The encoder according to claim 1, wherein each of the plurality of reflection structures includes a light reflection layer disposed on a surface of a convex lens or a surface of a concave lens provided on the board, or between the convex lens or the concave lens and the board.

22. The encoder according to claim 1, wherein each of the plurality of reflection structures includes a convex pattern or a concave pattern made of a metallic material.

* * * * *